March 25, 1930.  F. O. HÄNNI  1,752,256
GAUGE FOR MEASURING THE DIFFERENCE BETWEEN TWO PRESSURES
Filed Feb. 10, 1928  2 Sheets-Sheet 2
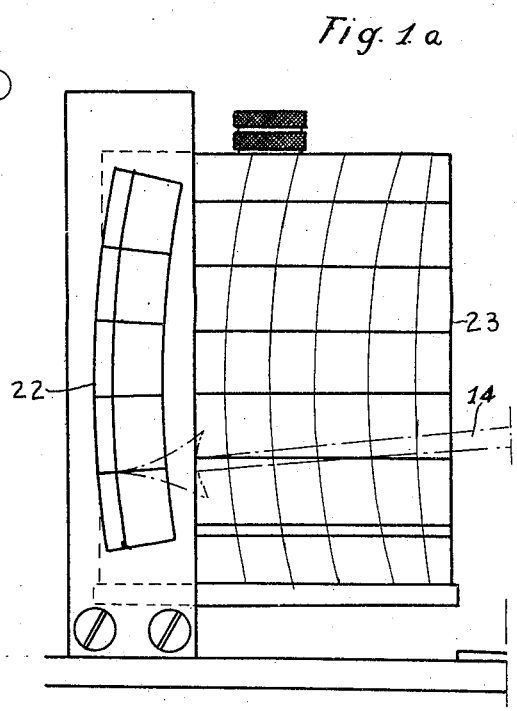
Fig. 1a
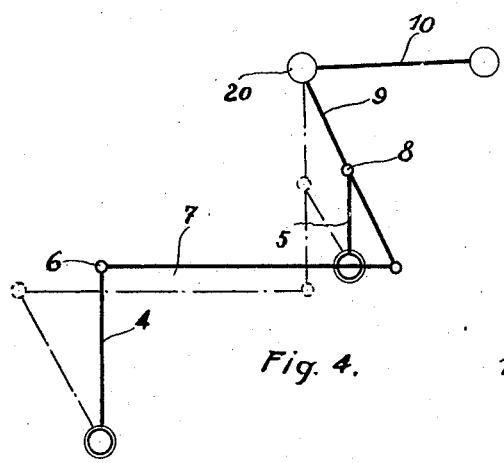
Fig. 4.
Fig. 2a
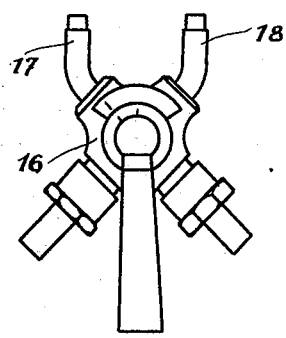
Fig. 3.
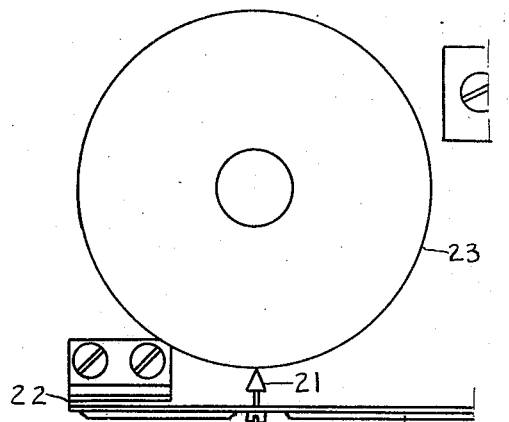
INVENTOR
F. O. Hänni Patented Mar. 25, 1930

1,752,256

UNITED STATES PATENT OFFICE

FRIEDRICH OTTO HÄNNI, OF JEGENSTORF, SWITZERLAND

GAUGE FOR MEASURING THE DIFFERENCE BETWEEN TWO PRESSURES

Application filed February 10, 1928, Serial No. 253,488, and in Germany February 12, 1927.

The present invention relates to a gauge for measuring the difference between two pressures.

The apparatus heretofore proposed for measuring the difference between two pressures have not given much satisfaction. In certain known apparatus where two measuring devices were working at the two ends of a balance lever these devices were not able to move independently from each other and this was the cause of disadjustments. Later on devices were found which allowed an independent working of the two measuring devices and which registered the difference of the strokes. But the apparatus were not arranged so as to allow the eliminating of each cause of disarrangement. The pivot of the indicating hand was not stationary and therefore the markings were distorted on one side only according to the amount of the pressures.

It is the object of the present invention to propose an apparatus in which the difference between two pressures is indicated directly. This apparatus is of the kind in which two measuring systems operate on a common lever in order to cause it to swing on the same pivot. In the apparatus according to the present invention the reciprocal position of the pivot and of the points where the forces attack this lever are chosen so that on an equivalent stroke of the measuring systems the position of the pivot does not change.

The annexed drawing represents as an example one working form of the object of the invention, that is an instrument for registering even very small differences of pressure.

Figure 1:
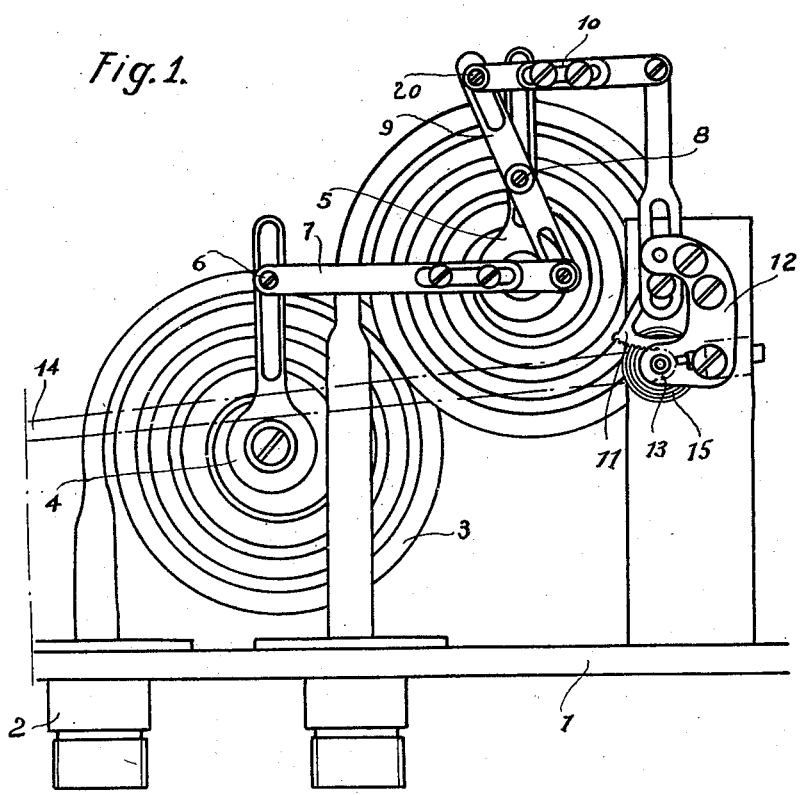
Figure 2:
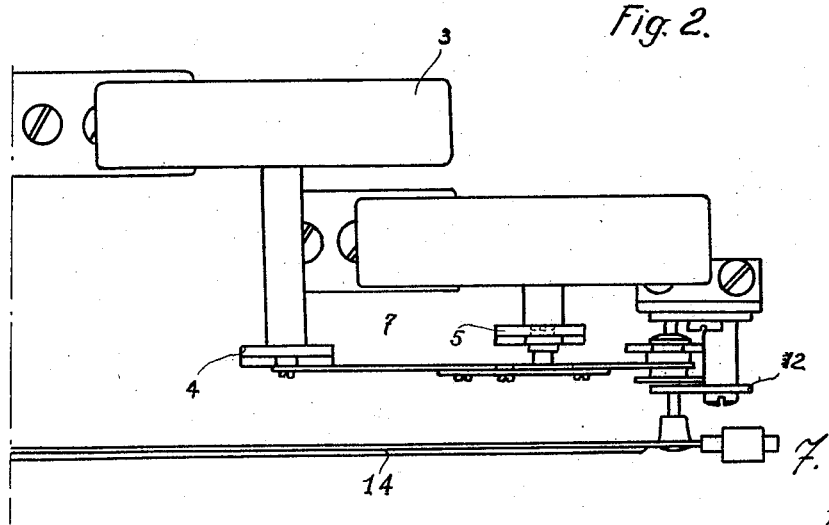

The Fig. 1 and 1ª are a front view with the upper part of the casing removed,

Fig. 2 and 2ª are a plan, Figures 1ª and 2ª being continuations of the Figures 1 and 2 respectively, Fig. 3 a front view of a four way cock by which both systems may be put under pressure, and Fig. 4 is a diagram showing the different positions which the moving parts of the instrument may assume.

The two measuring systems are similar with exception of their connections and their cranks 4 and 5, crank 4 being twice as long as crank 5. Therefore only one system shall be described. Similar letters of reference indicate similar parts.

To the socket joint 2 at the bottom plate 1 of the casing is connected a tube 3 spirally bent after the Bourdon fashion which carries at its center an upright crank 4 or 5 respectively. The crank arms are parallel and slotted for adjusting purposes. To a pivot 6 adjustably held on the arm 4 is attached an extensible rod 7 and the pivot pin 8 of an equal-armed lever 9 is adjustably fixed to the crank 5. A pivot pin is provided at each end of the lever 9, whereof the upper end is attached to a link 10 transmitting the movements of lever 9 to a toothed segment 11 pivotally supported by a bracket 12. Said segment meshes with a pinion 13 fixed to the axis of the hand 14 and a spring 15 is adapted for taking up the play of the gearing.

The lower end of lever 9 is connected to the rod 7 and is moved by this lever according to the strokes of the crank 4. The working of the described arrangement is to be seen from the diagram of Fig. 4.

The two measuring systems are submitted simultaneously to the pressures by means of the four-way cock 16 assuring a simultaneous opening of the two admission conduits 17 and 18. If the pressures are exactly alike the strokes of the cranks 4 and 5 are equivalent and likely directed, because the arrangements of the two systems are equivalent. In the two positions represented once with heavy lines and once with mixed lines it becomes evident that these strokes are annulling each other before the point 20 where the upper end of lever 9 is connected to the arm 10 and that said point 20 does not move. The segment 11 and the hand 14 don't change their position. If however the strokes of the cranks 4 and 5 are different, this difference will be marked by a displacing of the point 20 in the one or the other direction. The instrument registers therefore directly the difference of both pressures and each change caused by an increase or a decrease of pressure will be indicated by a stroke of the hand 14. This hand carries a writing pen 21 and is arranged so as to move with its point along a graduated scale 22 and with its pen on a registering drum 23 rotated by a clockwork. By this arrangement the result of the measuring may be seen at once on the scale and is marked simultaneously on the drum in a well known manner.

What I claim as new is:

1. In a gauge for measuring the difference between two pressures and in combination, a casing having a bottom plate, two tubes spirally bent after the Bourdon fashion, socket joints adapted to join said tubes to the bottom of the plate and to pressure conduits, two slotted parallel crank arms fixed to the centers of said tubes and located in the same plane and turned into the same direction, an equal-armed lever having slotted ends and being pivotally attached intermediate its slotted ends to the end of one of said cranks and a rod pivoted to one end of said lever and to the end of the other crank all arranged so that an equal stroke of said cranks will leave the free end of said lever stationary, a bracket, a toothed segment having an arm pivoted on said bracket, a link pivoted to this arm and to the free end of said lever, an axle mounted on said bracket and a pinion fixed to the axle and meshing with said segment, a hand held by said axle and a rotatably arranged registering drum disposed so as to be capable of registering the path of said hand.

2. In a gauge for measuring the difference between two pressures and in combination, a casing having a bottom plate, two tubes spirally bent after the Bourdon fashion, socket joints adapted to join said tubes to the bottom plate and to pressure conduits, two slotted parallel crank arms one having half the effective length of the other and both being fixed to the centers of said tubes, an equal-armed lever pivotally and adjustably fixed intermediate its ends to the end of the smaller crank and having slots near its ends, an extensible rod adjustably pivoted in the slot in one end of said lever and pivotally fixed to the slot in the end of the other crank, all arranged so that an equal stroke of said cranks will leave the free end of said lever stationary, a bracket, a toothed segment having an arm pivoted on said bracket, a link pivoted to this arm and to the free end of said lever, an axle mounted on said bracket and a pinion fixed to the axle and meshing with said segment, a hand held by said axle and a rotatably arranged registering drum capable of registering the path of said hand and a four-way cock as means for admitting the pressure to the spring tubes simultaneously.

In testimony whereof I affix my signature.

FRIEDRICH OTTO HÄNNI.